Patented Dec. 23, 1952

2,623,079

UNITED STATES PATENT OFFICE 2,623,079

METHOD OF VULCANIZING RUBBER WITH SULFUR

Cleon R. Johnson, Ridgewood, N. J.

No Drawing. Application September 22, 1949, Serial No. 117,273

2 Claims. (Cl. 260—775)

This invention relates to certain improvements in the art of rubber vulcanization, and the invention has especial reference to preparation and use of the vulcanizing sulfur in a special form adapted to overcome certain difficulties heretofore encountered in rubber vulcanization.

The so-called "scorching" of rubber has represented a serious difficulty in the art of rubber vulcanization, resulting in waste of materials, improperly cured batches, and extra labor and trouble in maintenance of equipment.

"Scorching" results from vulcanization to an unintended degree and arises from various causes including premature vulcanization during mixing or compounding of the ingredients being prepared for vulcanization.

The ingredients of a rubber mix are ordinarily thoroughly worked in some mixing process in order to secure thorough admixture of the various ingredients, and this working develops heat, frequently attaining a temperature at which appreciable vulcanization will occur, especially if the working is continued for a substantial length of time in order to secure the desired intimate admixture of the ingredients. Such working is frequently effected by mixing various ingredients of the rubber compound in dry form in an internal mixer of the Banbury type. Milling rubber compounds on open rubber mills is also a common practice, and either of the techniques referred to above tends to substantially elevate the temperature of the rubber compounds being mixed. From the standpoint of production output, with given equipment, it is, of course, desirable to effect the working at a high rate and increase in the rate of working also tends to excessively raise the temperature of the mix. These conditions tend to promote premature vulcanization of more or less indefinite extent.

Certain attempts have been made to alleviate this difficulty, including the practice of deferring addition of the vulcanizing sulfur until a late stage of the mixing, but even this expedient is not always effective, especially in instances where the rubber mix is to be extruded or applied by rolls or the like to cloth prior to the actual vulcanization treatment. Processing of this kind frequently involves a relatively high temperature close to the range where vulcanization commences.

Another factor which aggravates the scorching difficulty is the addition of vulcanization accelerators which tend to shorten the time required for vulcanization and also tend to lower the temperature at which vulcanization will occur in a given time. The addition of accelerators is, of course, desirable from the standpoint of output from given vulcanization equipment, but the greater the dosage of accelerators, the greater is the danger of premature curing during the working or compounding of the mix.

Other attempts to overcome the scorching problems have been made, including the addition of materials known as retarders, for instance organic acids such as salicylic acid, benzoic acid, and derivatives of such acids. These additions, however, act to partially nullify the effect of accelerators added and therefore impair the intended action of the accelerators during the vulcanization itself.

The present invention is based upon the discovery that the foregoing and certain other difficulties hereinafter mentioned are greatly alleviated by adding the sulfur to the mix in the form of finely divided particles coated with a protective or sealing layer of a film forming material especially certain resins as mentioned more fully hereinafter. In the practice of the invention, the coating of the sulfur particles acts as a protective sealant at the temperatures encountered in the mechanical working incident to compounding, extrusion or the like, and this appreciably reduces the premature vulcanization during such mechanical working. However, when the mix is subjected to the more elevated temperature of the vulcanization itself, the coating no longer seals the sulfur particles, in consequence of which the sulfur is released for reaction with the rubber.

In a typical treatment, the sulfur in finely divided form is preliminarily thoroughly mixed with a solution of a film forming resin and this mixture is then diluted with more solvent and finally subjected to spray drying, so as to produce a product comprising finely divided particles of sulfur which are coated with the resin. This resin coated product may then be added to the desired rubber mix and subjected to milling for thorough dispersion in the mix, after which the mix is subjected to the vulcanization treatment.

While not all of the reasons why this treatment is effective for the purposes described are fully understood, nevertheless it has been found that various resins having the characteristics mentioned herebelow serve the purpose, i. e., act as a protective sealant at the temperatures encountered in milling or working, but lose that capability upon appreciable elevation of temperature to the desired point in the usual vulcanization range. In consequence scorching is greatly diminished.

The practice of the invention also makes possible the employment of larger dosages of accelerators without encountering premature vulcanization, and thus the time of vulcanization can be reduced with substantial economic gain.

Still another advantageous result following from the practice of the invention is reduction in tendency toward "blooming." "Blooming" is an effect manifested by the appearance on the surface of the unvulcanized rubber of crystals of sulfur, apparently because of migration of sulfur from the interior of the rubber compound to the surface. This effect frequently requires troublesome washing of the bloomed surface with a solvent. In an attempt heretofore to overcome this tendency toward blooming, insoluble sulfur has been employed in the vulcanization of rubber, but insoluble sulfur is many times as expensive as the sulfur ordinarily used. In the practice of the present invention it has been found that blooming is greatly diminished, and this is a further substantial advantage in the practice of the present invention.

In connection with the film forming material to be employed, it should be kept in mind that since the function of this material is in a sense mechanical rather than chemical, any of a wide variety of materials may be used, so long as they have certain of the characteristics which are necessary to ensure its performance of the function of protectively sealing the sulfur particles.

Various specific resins which may be utilized are mentioned herebelow, but it is here first pointed out that in addition to capability of film formation, the resin should preferably also be one in which the sulfur is not soluble and which is further itself substantially insoluble in the compounded rubber. Since it is contemplated that the resin should retain its protective sealing effect during the milling, the resin should also be one which is not extensively softened by contact with the rubber compound.

The film forming material employed should still further be substantially inert at the temperatures encountered in milling with reference to the sulfur itself or vulcanizing accelerators used.

Since temperatures encountered in milling and/or processing of rubber before vulcanization frequently range as high as from 200° F. to 260° F., the material used should retain its protective or sealing characteristic at such temperatures. Vulcanization, however, will occur at temperatures as low as from 250° F. to 260° F., if the rubber is held long enough at these temperatures and sometimes even at somewhat lower temperatures, but for most purposes a temperature above 260° F. is preferred for vulcanization, in view of which retention of the sealing property of the material up to about 260° F. will not impair ultimate vulcanization at a temperature of say 280° F.

Film forming resins which are both water soluble and water insoluble have been found to meet the above qualifications. For instance water soluble urea formaldehyde, melamine formaldehyde, and methyl cellulose resins have been found to function in the manner described above. Water insoluble resins such as nitrocellulose, ethyl cellulose, vinyls, and mixtures of nitrocellulose with curing resins have also been found to have the protective effect contemplated by the invention.

In the preferred practice of the invention, the coated sulfur particles are prepared by first preparing a suspension or slurry of sulfur in water or in some other solvent for the film forming material, depending upon the solubility characteristics thereof. This mixture is then preferably thoroughly mixed as by ball milling for a number of hours. Depending upon the consistency of the mixture, it may then further be diluted with water or solvent to an appropriate consistency for delivery through a spray nozzle into a drying chamber. As the particles of sulfur leave the spray nozzle they are covered with a layer of the film forming material in solution, and the water or other solvent evaporates in the drying chamber, producing finely divided particles of sulfur coated with the film forming material.

In connection with the ratio of the film forming material to sulfur, it may be said that the ratio is not critical, apparently because the film former performs a mechanical rather than a chemical function. A coating comprising from about 10% to 50% of the weight of the sulfur is effective for the purposes of the invention.

EXAMPLES

In all of the examples herebelow certain uniform tests were used to determine the extent of vulcanization, scorching, etc. Thus, in a typical case a rubber compound of the kind similar to that used in tire treads was prepared in the usual manner, except for the omission of the sulfur. The batch was then divided into equal portions and to one portion was added the amount of rubber makers' sulfur called for by the recipe, and this was considered as the control compound. To the other portion was added a resin coated sulfur according to the invention, in an amount calculated to introduce the same amount of elemental sulfur as was introduced into the control compound. Samples from these comparative batches were then subjected to vulcanization at time and temperature simulating the conditions encountered in working and processing of rubber mixes. For this purpose a temperature in the neighborhood of 250° F. was used and this temperature was maintained in a typical case for about 45 minutes. These conditions of temperature and time are similar to those attained in the mixing or processing of rubber mixes. The sheets secured from these test vulcanizations were .075" thick and these were cut from the edge to a distance of 2.5" in a strip ¼" wide, tongue fashion. These strips were then pulled to full length of extension five times and allowed to relax. After five minutes the length of the strip was measured and compared with its initial length. The distance which the strip failed to recover was measured and recorded as the "set." This test is a measure of the extent of vulcanization of the piece, and if the test strip recovered almost fully (i. e., showed a small "set"), appreciable vulcanization had taken place; whereas, if the test strip remained appreciably extended (i. e., showed a large "set") a lesser degree of vulcanization is indicated.

As will be seen in the examples given herebelow the control compounds generally showed a set of from ⅛" to ¼", whereas the comparative compounds or mixes containing the resin coated sulfur ranged from ⅝" to 1¼", the latter showing a much retarded vulcanizing effect, as compared with the control compounds.

In the following examples other samples of the comparative compounds were also vulcanized at the usual vulcanization temperature and time, and these latter vulcanizations clearly show that the compounds containing the resin coated sulfur of the present invention, vulcanized satisfactorily at the usually desired levels of time and temperature.

Thus, comparison of the two types of vulcanizations shows that the coated sulfur greatly retards tendency to premature vulcanization at the temperature frequently encountered in working or processing of rubber mixes, although the desired vulcanizing effect is not impaired when the temperature is elevated substantially above the range commonly encountered in working or processing.

In each of the examples given herebelow the formulation under the first column represents the control compound and the formulation given in the second column represents the test compound. The examples identify the method of coating sulfur used and also give test results from the vulcanizations, according to the methods of evaluating fully described above.

Unless otherwise indicated in the following examples the figures given represent parts by weight.

*Example I*

In preparing the sulfur for use in this example, 200 g. of a vinyl chloride, acetate copolymer resin (Carbide & Carpide Chemicals Corp. Vinyl Resin VYNW) were dissolved in 2000 g. of acetone and 200 g. of rubber makers' sulfur were added. The mixture was ball milled 18 hours following which the suspension was spray dried. The resulting coated sulfur was tested, as follows:

|  | A | B |
|---|---|---|
| Smoked Sheets | 100 | 100 |
| EPC Channel Black | 50 | 50 |
| Pine Tar | 5 | 5 |
| Stearic Acid | 3 | 3 |
| Zinc Oxide | 4 | 4 |
| Neozone D (Phenyl-beta-naphthylamine) | 1 | 1 |
| Benzothiazyldisulphide | 1 | 1 |
| Sulfur | 2.5 | -------- |
| Vinyl Resin Coated Sulfur | -------- | 5.0 |

Sheets from the above rubber mixtures were vulcanized for 60 minutes at 245° F., and tested for set as described above, with the following results:

|  | A | B |
|---|---|---|
| Set | Inches 3/16 | Inches 5/8 |

*Example II*

The sulfur was here prepared in a somewhat different way. First, the following mixture of resins was prepared:

|  | Solids | Formula |
|---|---|---|
|  |  | G. |
| Cellulose Nitrate (35% Solution in Ethyl Acetate) | 50 | 143 |
| Alkyd Resin (Oil Modified Phthalic Anhydride Glycerol Condensate—55% in Xylene, as marketed by American Cyanamid Company under trade name Rezyl 387-5) | 25 | 45 |
| Butylated Urea Formaldehyde Resin (50% Solution in Xylene, as marketed by Rohm and Haas Company under trade name Uformite MM-55) | 25 | 50 |
| Methyl Isobutyl Ketone | -------- | 60 |
|  | 100 | 298 |

To the above mixture 100 g. of rubber makers sulfur was added and the mixture thinned with acetone to a volume of .95 liter. The mixture was ball milled for 16 hours. Then the mixture was thinned with 467 g. acetone and spray dried.

Sulfur prepared as above was tested in exactly the same recipe as given in Example I. In both the control and the experiment itself the amount of elemental sulfur present was 2.5%, although the quantity of the coated sulfur product added was 5%. The control and the experiment are here identified by the letters C and D and sample sheets of both were vulcanized for 60 minutes at 245° F., with the following results:

|  | C | D |
|---|---|---|
| Set | Inches 3/16 | Inches 1.0 |

Sheets were also vulcanized 45 minutes at 280° F., giving the following physical results:

|  | C | D |
|---|---|---|
| Tensile lbs./sq. in. at Break | 3,970 | 3,880 |
| Modulus at 300% Elongation | 1,270 | 1,330 |
| Elongation at Break (Percent) | 590 | 570 |

*Example III*

The sulfur was here prepared, as follows:
Ethyl cellulose (Hercules Powder Co.
  N–7) --------------------------------- g-- 90
Butanol ---------------------------------- g-- 122
Xylol ------------------------------------ g-- 488
Rubber makers' sulfur ------------------- g-- 210

The mixture was ball milled for 18 hours and spray dried.

The test was made with the same rubber formula as in Example I, with the sulfur dosage as follows:

|  | E | F |
|---|---|---|
| Sulfur | 2.5 | -------- |
| Coated Sulfur | -------- | 3.58 |

Sheets of the above vulcanized 45 minutes at 250° F., gave the following results:

|  | E | F |
|---|---|---|
| Set | Inches 3/16 | Inches 1 3/16 |

When vulcanizing 60 minutes at 280° F. the following properties were secured:

|  | E | F |
|---|---|---|
| Tensile | 4,400 | 4,250 |
| Modulus | 1,680 | 1,380 |
| Elongation | 600 | 635 |

*Example IV*

The sulfur was prepared as follows:

Methyl cellulose ------------------------ g-- 35.3
Water ----------------------------------- g-- 847
Rubber makers' sulfur ------------------ g-- 200

The methyl cellulose was added to ½ the above quantity of water, soaked 20 minutes and then the balance of the water was added. The sulfur was mixed in and ball milled 20.5 hours. The mixture was too thick to spray, and 300 g. water was added. To overcome considerable foaming, .1 g. of silicone antifoam agent (DC Antifoam A by Dow-Corning Co.) was added and ball milled an additional 15 minutes.

The above was spray dried, and tested in the same recipe as in Example I.

|  | G | H |
|---|---|---|
| Rubber Makers' Sulfur | 2.5 |  |
| Coated Sulfur |  | 2.94 |

Vulcanized 45 minutes at 250° F.

|  | G | H |
|---|---|---|
| Set | Inches 1/4 | Inches 3/8 |

It may be noted that the test compound and the control compound indicate only slight difference in this case. It is pointed out, however, that the ratio of resin to sulfur in this example is relatively low (about 15/85), and with certain resins it is preferred to utilize a higher resin to sulfur ratio, to thereby secure a thicker envelope or coating of the sulfur particles.

*Example V*

Sulfur was prepared in accordance with the following: First a dispersion of sulfur in water was prepared by ball milling the following ingredients for 72 hours.

Sulfur _____ g__ 1640
Water _____ g__ 850
Darvan #1 (sodium salts of polymerized aryl-alkyl sulphonic acids _____ g__ 35.5

The above was combined with the resin according to the following formula:

Urea formaldehyde resin (Uformite 500 of Rohm & Haas Co.) _____ g__ 105
Water _____ g__ 175
Sulfur (301 g. above sulfur dispersion) __ g__ 195

The mixture of the sulfur with the resin was then ball milled for 20.5 hours and 250 g. of water added to bring the mixture to proper consistency for spray drying. A small amount of an inorganic salt (Q116 Catalyst of Rohm & Haas Co.) furnishing an acid pH reaction in water was added as a catalyst, so as to insolubilize the resin in the manner well understood in this art.

|  | J | K |
|---|---|---|
| Rubber Makers' Sulfur | 2.5 |  |
| Coated Sulfur |  | 3.85 |

Vulcanized 45 minutes at 250° F.

|  | J | K |
|---|---|---|
| Set | Inches 1/4 | Inches 1 |

Vulcanized 45 minutes at 280° F.

|  | J | K |
|---|---|---|
| Tensile | 3,970 | 4,140 |
| Modulus | 1,500 | 1,600 |
| Elongation | 580 | 555 |

*Example VI*

The sulfur was prepared as follows:
Melamine-formaldehyde resin (Melmac 405, American Cyanamid Co.) _____ g__ 105
40% alcohol in water _____ g__ 325
Sulfur (301 g. sulfur dispersion prepared as in Example V) _____ g__ 195

The mixture was stirred thoroughly and sprayed. The coated sulfur was tested in the same recipe as in Example I.

|  | L | M |
|---|---|---|
| Rubber Makers' Sulfur | 2.5 |  |
| Coated Sulfur |  | 3.85 |

Vulcanized 45 minutes at 250° F.

|  | L | M |
|---|---|---|
| Set | Inches 1/4 | Inches 17/32 |

I claim:

1. In the art of compounding and vulcanizing rubber, the method of mechanically working the rubber with sulfur in the form of discrete particles individually coated with a film forming resinous material acting as a sealant for the sulfur under the conditions of the mechanical working but not under the conditions of vulcanization, and thereafter effecting vulcanization of the intermixed rubber and sulfur by the application of heat of sufficient temperature to effect reaction of said sulfur with the rubber.

2. A method according to claim 1 in which the coating material for the sulfur particles comprises from 10% to 50% of the weight of the sulfur.

CLEON R. JOHNSON.

REFERENCES CITED

The following references are of record in the file of this patent:

UNITED STATES PATENTS

| Number | Name | Date |
|---|---|---|
| 375,405 | Wiehoft | Dec. 27, 1887 |
| 1,752,351 | Rothenberg et al. | Apr. 1, 1930 |
| 1,782,693 | Miller | Nov. 25, 1930 |
| 1,969,242 | Szegvari | Aug. 7, 1934 |
| 1,977,748 | Webster | Oct. 23, 1934 |
| 2,080,409 | Ceccon | May 18, 1937 |
| 2,299,917 | Minger et al. | Oct. 27, 1942 |